United States Patent
Lee et al.

(10) Patent No.: US 9,508,136 B2
(45) Date of Patent: Nov. 29, 2016

(54) IMAGE FUSING METHOD

(71) Applicant: HANWHA TECHWIN CO., LTD., Changwon-Si (KR)

(72) Inventors: Joonsung Lee, Changwon-si (KR); Jeongmin Bae, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/669,161

(22) Filed: Mar. 26, 2015

(65) Prior Publication Data
US 2015/0325021 A1 Nov. 12, 2015

(30) Foreign Application Priority Data
May 8, 2014 (KR) .................. 10-2014-0054928

(51) Int. Cl.
| | | |
|---|---|---|
| G06K 9/40 | (2006.01) | |
| G06T 5/50 | (2006.01) | |
| G06T 11/60 | (2006.01) | |
| G06T 5/00 | (2006.01) | |
| H04N 5/33 | (2006.01) | |

(52) U.S. Cl.
CPC ............... *G06T 5/50* (2013.01); *G06T 5/009* (2013.01); *G06T 11/60* (2013.01); *G06T 2207/10024* (2013.01); *G06T 2207/10048* (2013.01); *G06T 2207/20221* (2013.01); *G06T 2207/30232* (2013.01); *H04N 5/332* (2013.01)

(58) Field of Classification Search
CPC ......... G06T 5/50; G06T 11/60; G06T 5/009; G06T 2207/10024; G06T 2207/10048; G06T 2207/30232; G06T 2207/20221; H04N 5/332
USPC ............. 382/274; 348/33, 164; 250/330-334
See application file for complete search history.

(56) References Cited

U.S. PATENT DOCUMENTS 7,800,064 B2   9/2010  Tadano

FOREIGN PATENT DOCUMENTS

| JP | 200910675 A | 1/2009 | |
|---|---|---|---|
| KR | 1020100018279 A | 2/2010 | |
| KR | 1020100104536 A | 9/2010 | |
| KR | 10-2012-0109057 | * 10/2012 | ............. H04N 5/262 |
| KR | 1020120109057 A | 10/2012 | |

* cited by examiner

*Primary Examiner* — Andrew Moyer
(74) *Attorney, Agent, or Firm* — Sughrue Mion, PLLC (57) ABSTRACT

Provided is an image fusing apparatus for fusing a thermal image and a visible image of a subject. The image fusing apparatus includes: a determination processor configured to determine importance of each pixel, based on a luminance value thereof, of the thermal image and the visible image; a pixel coefficient setting processor configured to set a pixel coefficient for each pixel of the thermal image based on the importance of each pixel of the thermal image and the visible image; a thermal image processor configured to generate another thermal image by applying the pixel coefficient to the luminance value of each pixel of the thermal image; and an image fusing processor configured to fuse the other thermal image and the visible image to generate a fused image.

18 Claims, 11 Drawing Sheets

IMAGE FUSING METHOD

CROSS-REFERENCE TO THE RELATED APPLICATION

This application claims priority from Korean Patent Application No. 10-2014-0054928, filed on May 8, 2014, in the Korean Intellectual Property Office, the disclosure of which is incorporated herein in its entirety by reference.

BACKGROUND

1. Field

Apparatuses and methods consistent with exemplary embodiments relate to image fusing, and more particularly, to fusing a thermal image of a subject and a visible image of the subject.

2. Description of the Related Art

In a monitoring system including a visible image camera, a control apparatus and a display apparatus, a monitor observing a moving image in the display apparatus has relatively low information recognition ability and situation management ability in a night illumination range.

Accordingly, a thermal image camera capturing a thermal image of a subject has recently been added to display a fused image resulting from fusing a thermal image and a visible image.

In this fused image, however, the definition of an image is basically reduced in a relatively bright important region.

Accordingly, the following image fusing method has been used in the related art.

First, in a thermal image, pixels having luminance values higher than a mean of luminance values of a visible image are selected, and luminance values of these selected pixels are increased and luminance values of the other pixels are decreased, thereby to obtain another thermal image.

Secondly, the visible image and the other thermal image obtained as above are fused together.

According to the above image fusing method, the definition of an image in a relatively bright region may be partially improved. However, the definition of an image is reduced in a certain portion of the relatively bright region due to high luminance of the thermal image.

SUMMARY

Exemplary embodiments of the inventive concept include methods of fusing a thermal image and a visible image, which may improve the overall definition of an image in a relatively bright region.

Various aspects of the inventive concept will be set forth in part in the description which follows and, in part, will be apparent from the description, or may be learned by practice of the presented exemplary embodiments.

According to an exemplary embodiment, there is provided an image fusing method for fusing a thermal image and a visible image of a subject which may include: determining importance of each pixel, based on a luminance value thereof, of the thermal image and the visible image; setting a pixel coefficient for each pixel of the thermal image based on the importance of each pixel of the thermal image and the visible image; generating another thermal image by applying the pixel coefficient to the luminance value of each pixel of the thermal image; and fusing the other thermal image and the visible image to generate a fused image, at an image fusing controller.

The determining of the importance of each pixel may include: determining a pixel of the thermal image of which a luminance value is equal to or greater than a first reference value calculated based on a mean of luminance values of the thermal image, as an important pixel of the thermal image; determining a pixel of the visible image of which a luminance value is equal to or greater than a second reference value calculated based on a mean of luminance values of the visible image, as a first important pixel of the visible image; and determining a pixel of the visible image of which a luminance value is equal to or greater than a third reference value which is preset, as a second important pixel of the visible image.

The first reference value may be obtained by adding the mean to a standard deviation of the luminance values of the thermal image.

The second reference value may be obtained by subtracting a standard deviation from the mean of the luminance values of the visible image.

The third reference value may be preset at an image fusing processor performing the fusing.

The setting of the pixel coefficient for each pixel of the thermal image may include setting a pixel coefficient for a pixel of the thermal image to a value "1" if this pixel is determined to be the important pixel of the thermal image, and a corresponding pixel of the visible image is determined to be not the first important pixel of the visible image but the second important pixel of the visible image, as a result of the determining.

The setting of the pixel coefficient for each pixel of the thermal image may also include setting a pixel coefficient for a pixel of the thermal image to a value selected between "0" and "1" if a corresponding pixel of the visible image is determined to be not the second important pixel of the visible image but the first important pixel of the visible image, as a result of the determining.

In the setting of the pixel coefficient for each pixel of the thermal image, a pixel coefficient for a pixel of the thermal image set if this pixel is determined to be not the important pixel of the thermal image is smaller than a pixel coefficient for this pixel of the thermal image set if this pixel is determined to be the important pixel of the thermal image and the corresponding pixel of the visible image is determined to be not the second important pixel of the visible image but the first important pixel of the visible image, as a result of the determining.

The fusing the other thermal image and the visible image may be performed by adding the visible image, to which a weight is applied, and the other thermal image to which the pixel coefficient and another weight are applied.

The image fusing method may further include adjusting a luminance value of each pixel of an original thermal image of the subject to generate the thermal image before the determining the importance of each pixel of the thermal image. The adjusting may be performed by increasing a luminance value of a pixel of the original thermal image if the luminance value of this pixel is higher than a mean of luminance values of the visible image and decreasing the luminance value of this pixel if the luminance value of this pixel is not higher than the mean of the luminance values of the visible image.

According to another exemplary embodiment, there is provided an image fusing apparatus for fusing a thermal image and a visible image of a subject which may include: a determination processor configured to determine importance of each pixel, based on a luminance value thereof, of the thermal image and the visible image; a pixel coefficient setting processor configured to set a pixel coefficient for each pixel of the thermal image based on the importance of each pixel of the thermal image and the visible image; a thermal image processor configured to generate another thermal image by applying the pixel coefficient to the luminance value of each pixel of the thermal image; and an image fusing processor configured to fuse the other thermal image and the visible image to generate a fused image.

The determination processor may include: a first determination processor configured to determine a pixel of the thermal image of which a luminance value is equal to or greater than a first reference value calculated based on a mean of luminance values of the thermal image, as an important pixel of the thermal image; and a second determination processor configured to determine a pixel of the visible image of which a luminance value is equal to or greater than a second reference value calculated based on a mean of luminance values of the visible image, as a first important pixel of the visible image, and determine a pixel of the visible image of which a luminance is equal to or greater than a third reference value which is preset, as a second important pixel of the visible image.

The first reference value may be obtained by adding the mean to a standard deviation of the luminance values of the thermal image.

The second reference value may be obtained by subtracting a standard deviation from the mean of the luminance values of the visible image.

The third reference value may be preset at an image fusing processor.

The pixel coefficient setting processor may set a pixel coefficient for a pixel of the thermal image to a value "1" if this pixel is determined to be the important pixel of the thermal image, and a corresponding pixel of the visible image is determined to be not the first important pixel of the visible image but the second important pixel of the visible image, as a result of the determining by the first and second determination processors.

The pixel coefficient setting processor may set a pixel coefficient for a pixel of the thermal image to a value selected between "0" and "1" if a corresponding pixel of the visible image is determined to be not the second important pixel of the visible image but the first important pixel of the visible image, as a result of the determining by the first and second determination processors.

The pixel coefficient setting processor may set the pixel coefficient for each pixel of the thermal image such that a pixel coefficient for a pixel of the thermal image set if this pixel is determined to be not the important pixel of the thermal image is smaller than a pixel coefficient for this pixel of the thermal image set if this pixel is determined to be the important pixel of the thermal image and the corresponding pixel of the visible image is determined to be not the second important pixel of the visible image but the first important pixel of the visible image, as a result of the determining by the first and second determination processors.

The image fusing processor may be configured to fuse the other thermal image and the visible image by adding the visible image, to which a weight is applied, and the other thermal image to which the pixel coefficient and another weight are applied.

The thermal image processor may be further configured to adjust a luminance value of each pixel of an original thermal image of the subject to generate the thermal image before the determination processor determines the importance of each pixel of the thermal image. The thermal image processor may adjust the luminance value of each pixel of the original thermal image such that a luminance value of a pixel of the original thermal image is increased if the luminance value of this pixel is higher than a mean of luminance values of the visible image, and the luminance value of this pixel is decreased if the luminance value of this pixel is not higher than the mean of the luminance values of the visible image.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the inventive concept.

The following descriptions and the accompanying drawings are for understanding operations according to the exemplary embodiments, and descriptions of well-known features, which may be easily implemented by those of ordinary skill in the art, will be omitted for conciseness.

Also, the specification and the drawings are not intended to limit the scope of the inventive concept, and the scope of the inventive concept is to be defined by the appended claims. For the best understanding of the inventive concept, the terms used herein are to be interpreted as having meanings and concepts that are consistent with the related art.

Hereinafter, exemplary embodiments will be described in detail with reference to the accompanying drawings.

Figure 1:
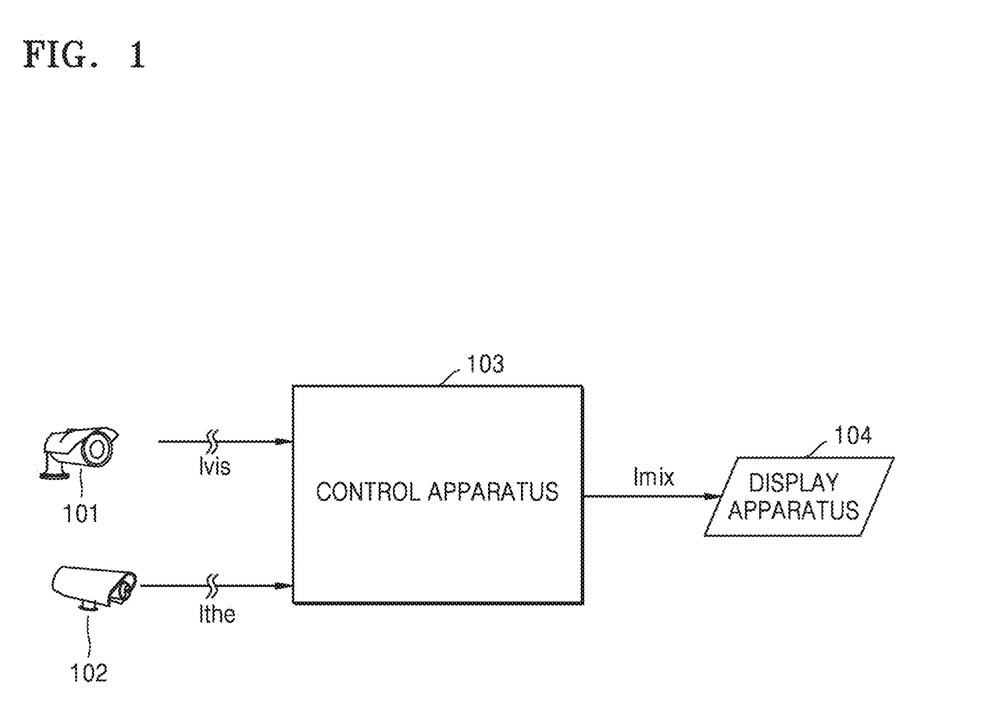
FIG. 1 is a diagram illustrating a controller for performing an image fusing method, according to exemplary embodiments.

FIG. 1 is a diagram illustrating a controller 103 for performing an image fusing method, according to an exemplary embodiment.

Referring to FIG. 1, a thermal image camera 102 outputs a thermal image Ithe of a subject. A visible image camera 101 outputs a visible image Ivis of the subject.

The controller 103 fuses the visible image from the visible image camera 101 and the thermal image from the thermal image camera 102.

The controller 103 provides a fused image Imix resulting from fusion of the visible image Ivis and the thermal image Ithe to a display apparatus 104. The controller 103 may store the visible image Ivis, the thermal image Ithe and/or the fused image Imix in a recorder.

Hereinafter, the image fusing method performed by the controller 103 according to exemplary embodiments will be described.

Figure 2:
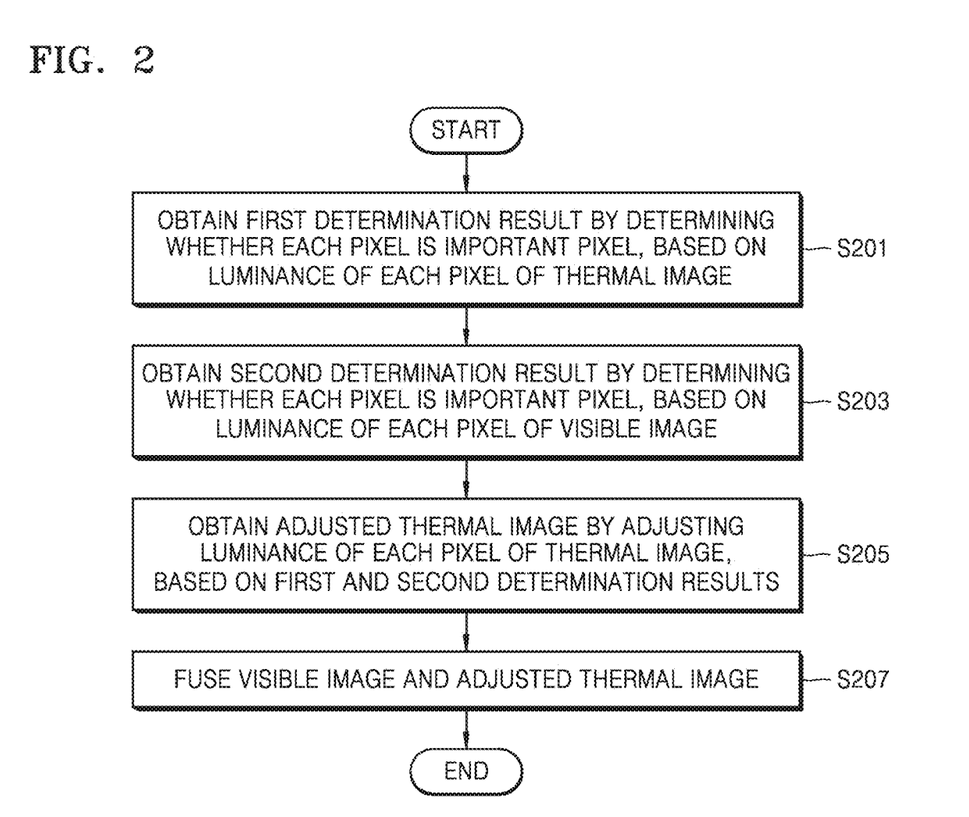
FIG. 2 is a flowchart of an image fusing method of a first exemplary embodiment performed by the controller of FIG. 1.

FIG. 2 is a flowchart of an image fusing method of a first exemplary embodiment performed by the controller 103 of FIG. 1. The image fusing method of the first exemplary embodiment will be described below with reference to FIGS. 1 and 2.

The controller 103 determines whether each pixel of the thermal image Ithe is an important pixel based on a luminance value of the each pixel to obtain a first determination result (operation S201). Here, the important pixel is a pixel of which a luminance value is equal to or greater than a first reference value, and the first reference value is or is calculated based on a mean of luminance values of the thermal image Ithe.

Thereafter, the controller 103 determines whether each pixel of the visible image Ivis is an important pixel based on a luminance value of the each pixel to obtain a second determination result (operation S203). Here, the important pixel is a pixel of which a luminance value is equal to or greater than a second reference value, and the second reference value is or is calculated based on a mean of luminance values of the visible image Ivis.

Thereafter, the controller 103 obtains an adjusted thermal image by adjusting the luminance of each pixel of the thermal image Ithe, based on the first and second determination results (operation S205).

Then, the controller 103 fuses the visible image Ivis and the adjusted thermal image (operation S207).

According to the image fusing method of the first exemplary embodiment, the luminance of each pixel of the thermal image Ithe is adjusted in consideration of importance of each pixel of the thermal image Ithe and importance of each pixel of the visible image Ivis in terms of luminance thereof. Then, the visible image Ivis and the adjusted thermal image may be fused to generate a final image.

Accordingly, the problem of the definition of an image being reduced in a portion of a relatively bright region due to a high luminance of the thermal image Ithe (that is, the problem of the image fusing method according to the related art) may be addressed. That is, the overall definition of the fused image may be improved by increasing or decreasing a coefficient of the thermal image Ithe for a pixel included in the relatively bright region by determining a coefficient for a pixel of a specific region in consideration of importance of each pixel of the thermal image Ithe and importance of each pixel of the visible image Ivis in terms of luminance thereof.

The first exemplary embodiment of FIG. 2 may be fully understood by a second exemplary embodiment that will be described with reference to FIGS. 3 to 9. This is because operation S201 of FIG. 2 corresponds to operation S303 of FIG. 3, operation S203 of FIG. 2 corresponds to operation S305 of FIG. 3, operation S205 of FIG. 2 corresponds to operation S307 of FIG. 3, and operation S207 of FIG. 2 corresponds to operation S309 of FIG. 3.

Figure 3:
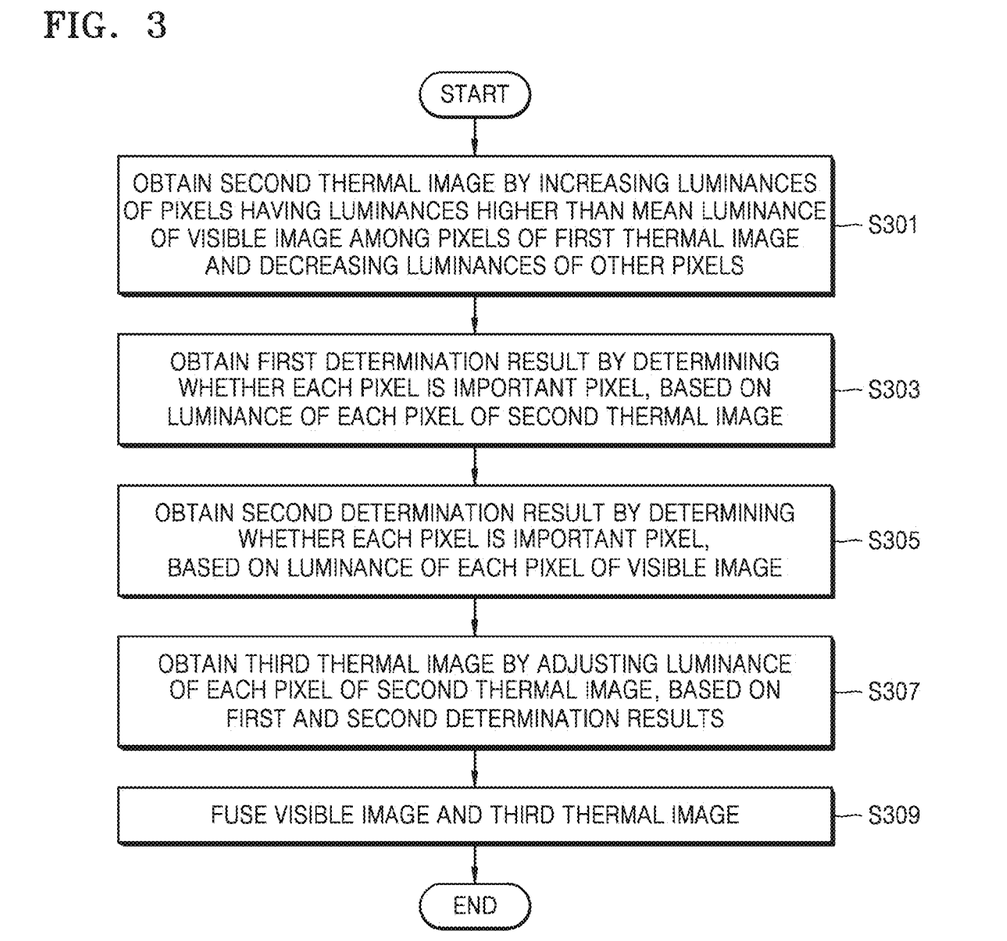
FIG. 3 is a flowchart of an image fusing method of a second exemplary embodiment performed by the controller of FIG. 1.
Figure 4:
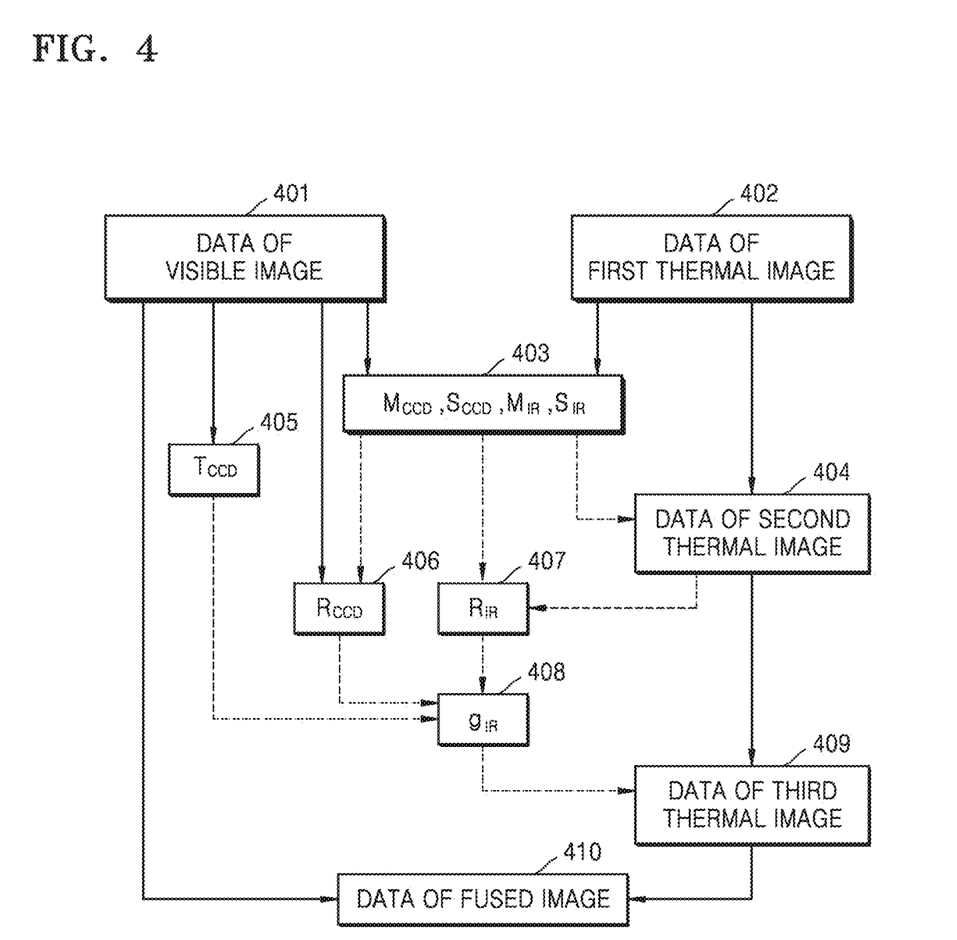
FIG. 4 is a diagram illustrating a flow of data generated by the image fusing method of FIG. 3, according to an exemplary embodiment.

FIG. 3 is a flowchart of an image fusing method of a second exemplary embodiment performed by the controller 103 of FIG. 1. FIG. 4 is a diagram illustrating a flow of data generated by the image fusing method of FIG. 3. In FIG. 4, a reference numeral "403" denotes statistical data.

The image fusing method of the second exemplary embodiment will be described below with reference to FIGS. 1, 3 and 4.

The controller 103 selects pixels of which a luminance value is higher than a mean $M_{CCD}$ of luminance values of a visible image (corresponding to the Ivis of FIG. 1) among pixels of a first thermal image (corresponding to the Ithe of FIG. 1), and increase the luminance of the selected pixels and decreases luminance of the other pixels of the first thermal image, thereby to obtain a second thermal image (operation S301). Here, an amount of the increased luminance and an amount of the decreased luminance may be predetermined or controlled at the controller 103.

That is, data 401 of the visible image is used to obtain the mean $M_{CCD}$ of luminance values of the visible image, and data 402 of the first thermal image is converted into data 404 of the second thermal image according to the mean $M_{CCD}$ of luminance values of the visible image, as shown in Equation 1 below.

$$x_{IRt} = \begin{cases} [(x_{IR} - m_{CCD})/m_{CCD} + 1]^2 & \text{if } x_{IR} \le m_{CCD} \\ [(x_{IR} - m_{CCD}) \cdot m_{CCD} + 1]^2 & \text{if } x_{IR} > m_{CCD} \end{cases} \quad (1)$$

In the above equation, $x_{IR}$ denotes a luminance value of a pixel in the first thermal image, $M_{CCD}$ denotes the mean of luminance values of the visible image, and $x_{IRt}$ denotes a luminance value of a pixel in the second thermal image.

Thereafter, the controller 103 determines whether each pixel of the second thermal image is an important pixel, based on a luminance value of each pixel of the second thermal image, thereby to obtain a first determination result (operation S303). In detail, the data 402 of the first thermal image is used to obtain a mean $M_{IR}$ and a standard deviation $S_{IR}$ of luminance values of the first thermal image, and a variable $R_{IR}$ 407 of the first determination result for each pixel of the data 404 of the second thermal image is obtained according to the mean $M_{IR}$ and the standard deviation $S_{IR}$ of luminance values of the first thermal image Ithe. Operation S303 will be described later in more detail with reference to FIG. 6.

Thereafter, the controller 103 determines whether each pixel of the visible image is an important pixel, based on a luminance value of each pixel of the visible image, thereby to obtain a second determination result (operation S305). In detail, variables $R_{CCD}$ 406 and $T_{CCD}$ 405 of the second determination result for each pixel of the data 401 of the visible image are obtained according to the mean $M_{CCD}$ and the standard deviation $S_{CCD}$ of luminance values of the visible image. Operation S305 will be described later in more detail with reference to FIG. 7.

Thereafter, the controller 103 obtains a third thermal image by adjusting the luminance value of each pixel of the second thermal image, based on the first and second determination results (operation S307). That is, a pixel coefficient $g_{IR}$ 408 for each pixel of the data 404 of the second thermal image is obtained according to the variable $R_{IR}$ of the first determination result and the variables $R_{CCD}$ 406 and $T_{CCD}$405 of the second determination result, and the data 404 of the second thermal image is converted into data 409 of the third thermal image according to the pixel coefficient $g_{IR}$. Operation S307 will be described later in more detail with reference to FIGS. 5 and 8.

Thereafter, the controller 103 fuses the visible image and the third thermal image (operation S309). That is, the data 401 of the visible image and the data 409 of the third thermal image are fused to generate data 410 of the final fused image.

According to the image fusing method of the second exemplary embodiment, the data 404 of the second thermal image is adjusted in consideration of importance of each pixel of the thermal image and importance of each pixel of the visible image in terms of luminance thereof. Then, the data 401 of the visible image and the data 409 of the third thermal image are fused together.

Accordingly, the problem of the definition of an image being reduced in a portion of a relatively bright region due to a high luminance of the second thermal image (that is, the problem of the image fusing method according to the related art) may be addressed. That is, the overall definition of the fused image may be improved by increasing or decreasing the coefficient of the thermal image for the pixel included in the relatively bright region by determining the coefficient for the pixel of a specific region in consideration of importance of each pixel of the thermal image and importance of each pixel of the visible image in terms of luminance thereof. Hereinafter, the configurations and effects of the second exemplary embodiment will be described in more detail.

Figure 5:
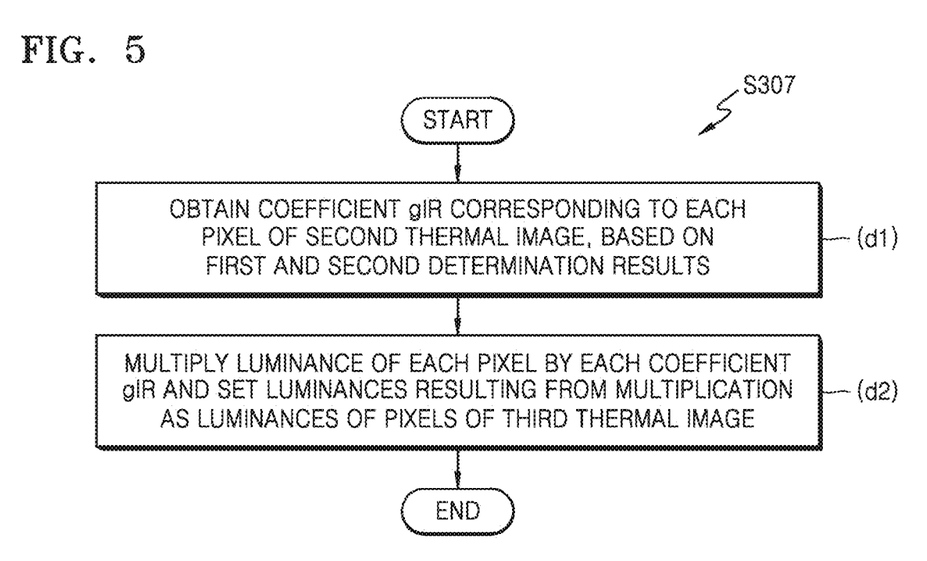
FIG. 5 is a detailed flowchart of operation S307 of FIG. 3, according to an exemplary embodiment.

FIG. 5 is a detailed flowchart of operation S307 of FIG. 3. Operation S307 of FIG. 3 will be described below in detail with reference to FIGS. 1, 4, and 5.

The controller 103 obtains the pixel coefficient $g_{IR}$ corresponding to each pixel of the second thermal image according to the first and second determination results (the values of $R_{IR}$, $R_{CCD}$ and $T_{CCD}$) (operation (d1)). Operation (d1) will be described later in detail with reference to FIG. 8.

Thereafter, the controller 103 multiplies the luminance value of each pixel of the second thermal image by the pixel coefficient $g_{IR}$ corresponding to the each pixel, and sets a result of the multiplication as a luminance value of each pixel of the third thermal image (operation (d2)). That is, when a luminance value of a pixel in the second thermal image is $x_{IRt}$ and a pixel coefficient corresponding to the pixel is $g_{IR}$, the luminance value of a corresponding pixel in the third thermal image is $g_{IR} \times x_{IRt}$.

In this case, in operation S309 of FIG. 3, when a luminance value of a pixel in the visible image is $x_{CCD}$, a luminance value $x_F$ of a fusion result of a corresponding pixel is obtained by Equation 2 below.

$$x_F = x_{CCD} \times w_{CCD} + x_{IRt} \times g_{IR} \times w_{IR} \quad (2)$$

In the above equation, $w_{CCD}$ denotes a weight of a pixel of the visible image, $w_{IR}$ denotes a weight of a corresponding pixel of the thermal image, $x_F$ denotes a luminance value of a corresponding pixel of the final fused image, $x_{CCD}$ denotes a luminance value of a corresponding pixel of the visible image, and $x_{IRt}$ denotes a luminance value of a corresponding pixel of the thermal image. Here, $w_{CCD}$ and $w_{IR}$ may be determined by Equation (3) below.

$$w_{CCD} = \frac{x_{CCD}}{x_{CCD} + x_{IR}}, \quad w_{IR} = \frac{x_{IRt}}{x_{CCD} + x_{IRt}} \quad (3)$$

In the above equation, $w_{CCD}$ denotes visible image data and $w_{IR}$ denotes thermal image data.

Figure 6:
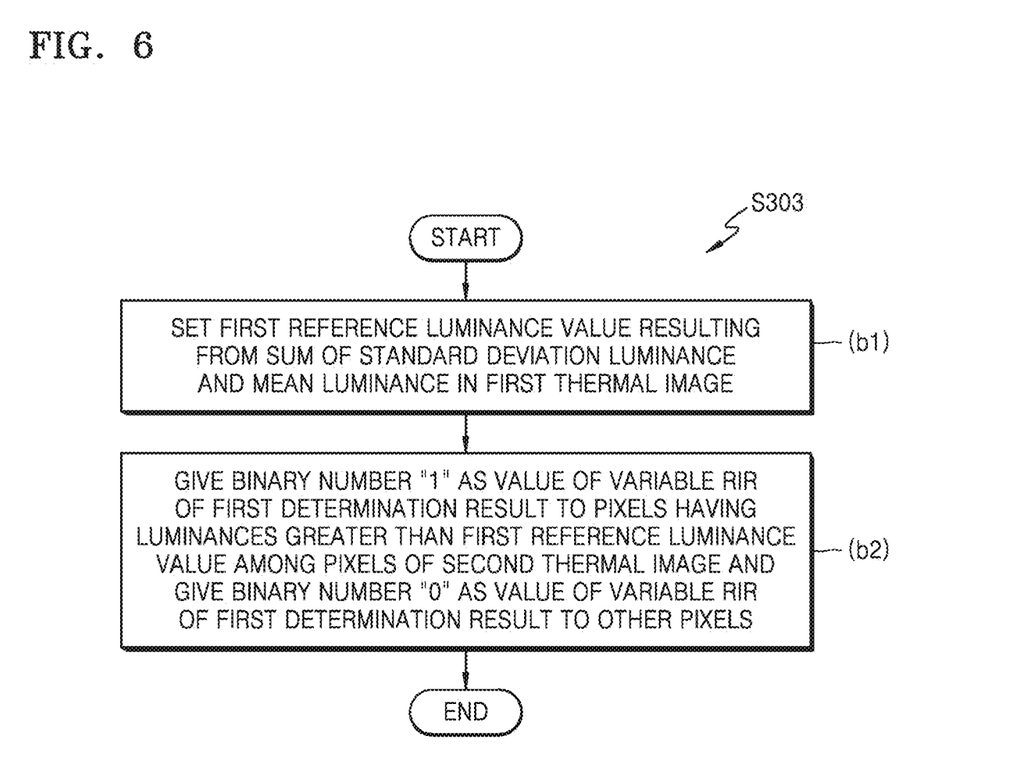
FIG. 6 is a detailed flowchart of operation S303 of FIG. 3, according to an exemplary embodiment.

FIG. 6 is a detailed flowchart of operation S303 of FIG. 3. Operation S303 of FIG. 3 will be described below in detail with reference to FIGS. 1, 4 and 6.

The controller 103 sets a first reference value $M_{IR}+S_{IR}$ by adding the mean $M_{IR}$ to the standard deviation $S_{IR}$ of luminance values of the first thermal image (operation (b1)).

Thereafter, the controller 103 gives a binary number "1" as the variable $R_{IR}$ of the first determination result to pixels of which a luminance value is greater than the first reference value $M_{IR}+S_{IR}$ in the second thermal image, and gives a binary number "0" as the variable $R_{IR}$ of the first determination result to the other pixels in the second thermal image (operation (b2)).

Figure 7:
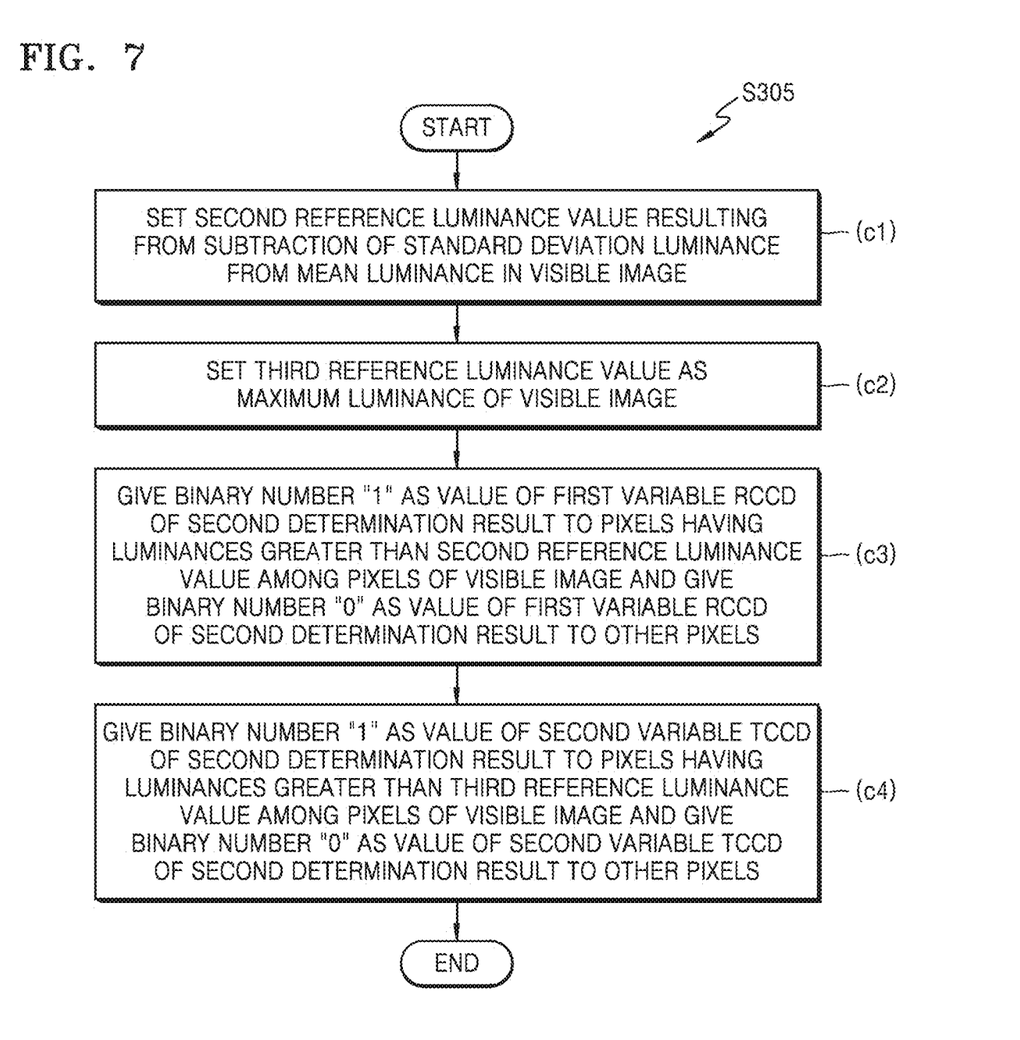
FIG. 7 is a detailed flowchart of operation S305 of FIG. 3, according to an exemplary embodiment.

FIG. 7 is a detailed flowchart of operation S305 of FIG. 3. Operation S305 of FIG. 3 will be described below in detail with reference to FIGS. 1, 4, and 7.

The controller 103 sets a second reference value $M_{CCD}-S_{CCD}$ by subtracting the standard deviation $S_{CCD}$ from the mean $M_{CCD}$ of luminance values of the visible image (operation (c1)).

Thereafter, the controller 103 sets a third reference value $P_{THR}$ (not illustrated) as a threshold luminance value of the visible image (operation (c2)). Here, the threshold luminance value is a reference value for determination of light saturation. A pixel having a luminance value equal to or greater than the threshold luminance value may be regarded as a saturated region, and the definition of a region including a pixel having a luminance value equal to or greater than the threshold luminance value is reduced in the visible image. Thereafter, the controller 103 gives a binary number "1" as the first variable $R_{CCD}$ of the second determination result to pixels of which a luminance value is greater than the second reference value $M_{CCD}-S_{CCD}$ in the visible image, and gives a binary number "0" as the first variable $R_{CCD}$ of the second determination result to the other pixels in the visible image (operation (c3)).

Thereafter, the controller 103 gives a binary number "1" as the second variable $T_{CCD}$ of the second determination result to pixels of which a luminance value is greater than the third reference value $P_{THR}$ in the visible image, and gives a binary number "0" as the second variable $T_{CCD}$ of the second determination result to the other pixels in the visible image (operation (c4)).

Figure 8:
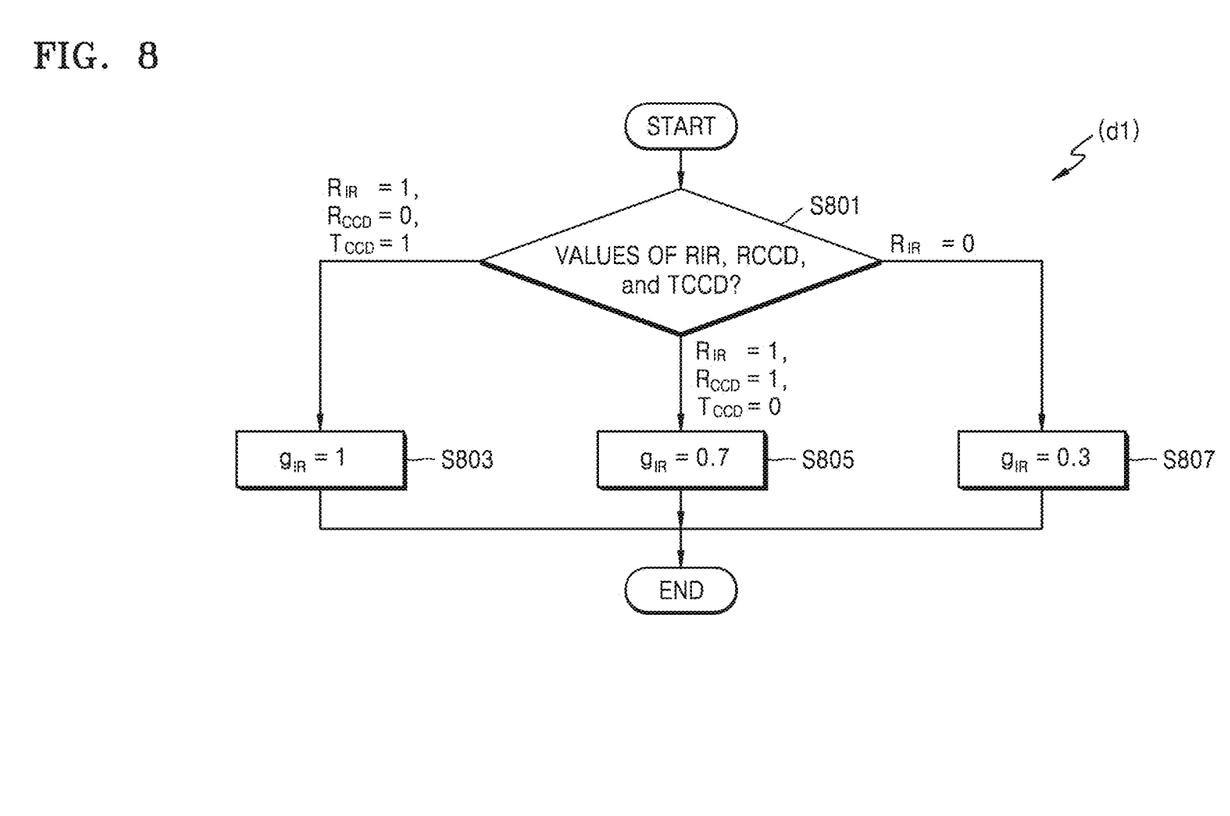
FIG. 8 is a detailed flowchart of operation (d1) of FIG. 5, according to an exemplary embodiment.

FIG. 8 is a detailed flowchart of operation (d1) of FIG. 5. Operation (d1) of FIG. 5 will be described below in detail with reference to FIGS. 1, 4, and 8.

The controller 103 gives a value "1" as the pixel coefficient $g_{IR}$ to pixels that are given a binary number "1" as the variable $R_{IR}$ of the first determination result, a binary number "0" as the first variable $R_{CCD}$ of the second determination result, and a binary number "1" as the second variable $T_{CCD}$ of the second determination result (operations S801 and S803).

The pixels given the value "1" in operation S803 are a region having a low definition due to high luminance caused by light saturation in the visible image and a region having a high definition in the thermal image, and the pixel coefficient $g_{IR}$ thereof is set to "1" in order to maintain the luminance of the thermal image.

Thereafter, the controller 103 gives a value selected in a range of "0.31" to "0.99" as the pixel coefficient $g_{IR}$ to pixels that are given a binary number "1" as the variable $R_{IR}$ of the first determination result, a binary number "1" as the first variable $R_{CCD}$ of the second determination result, and a binary number "0" as the second variable $T_{CCD}$ of the second determination result (operations S801 and S805). Here, since these pixels are included in a region in which light is not saturated, these pixels correspond to a region having a high definition in the visible image. For example, a value "0.7" is given as the pixel coefficient $g_{IR}$ to these pixels. Accordingly, the luminance of the thermal image may be decreased, and thus the luminance of the visible image data may be increased. That is, in the case of a region that may be definitely recognized in both the thermal image and the visible image, since the visible image data may be recognized more definitely than the thermal image data, the luminance of the thermal image data may be decreased by setting the pixel coefficient $g_{IR}$ to be smaller than 1.

Since there is a high probability that the pixels given a value in the range of "0.31" to "0.99", for example, "0.7" will be a region that may be recognized definitely in both the thermal image and the visible image, the luminance of the pixels of the second thermal image may be decreased slightly.

Thereafter, since pixels given a binary number "0" as the variable $R_{IR}$ of the first determination result are included in a region recognized as being dark in the thermal image, the controller 103 gives a value in a range of "0" to "0.30" as the pixel coefficient $g_{IR}$ to these pixels in order to further decrease the luminance of the thermal image data (operations S801 and S807). For example, a value "0.3" is given as the pixel coefficient $g_{IR}$ to the pixels.

Since the pixels given a value in the range of "0" to "0.30", for example, "0.3" are not important in the thermal image, a smaller pixel coefficient thereof may be given in order to further decrease the luminance value of these pixels of the second thermal image.

Here, an amount of the decreased luminance and an amount of the further decreased luminance may be predetermined or controlled at the controller 103.

Figure 9:
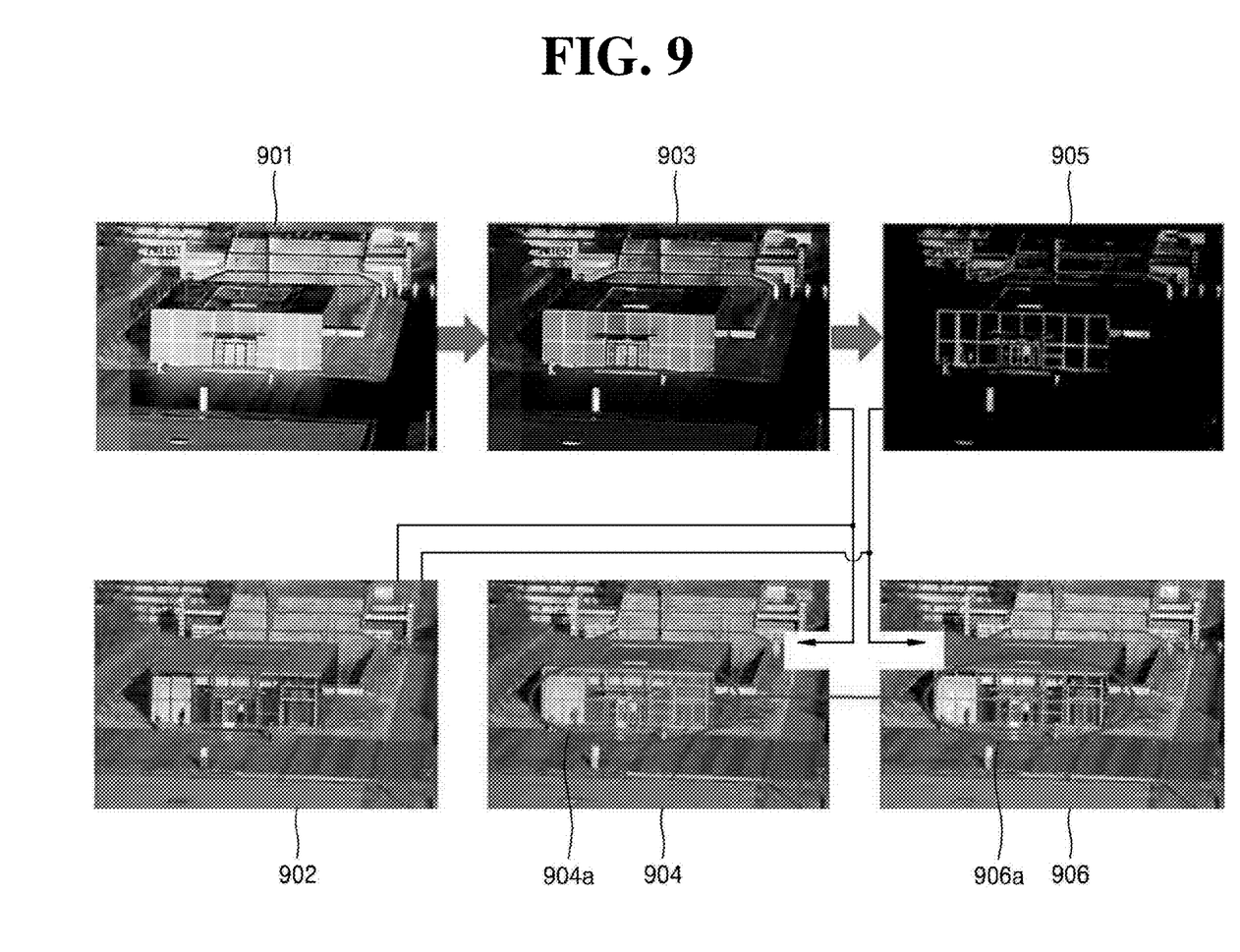
FIG. 9 is a diagram illustrating pictures taken to describe effects of exemplary embodiments.

FIG. 9 is a diagram illustrating pictures taken to describe effects of exemplary embodiments.

In FIG. 9, a reference numeral "901" denotes the first thermal image (Ithe in FIG. 1), a reference numeral "902" denotes the visible image (Ivis in FIG. 1), and a reference numeral "903" denotes the second thermal image.

Also, a reference numeral "904" denotes a fused image resulting from the fusion of the visible image 902 and the second thermal image 903, and a reference numeral "904a" denotes an important region thereof. A reference numeral "905" denotes a third thermal image.

Also, a reference numeral "906" denotes a fused image resulting from the fusion of the visible image 902 and the third thermal image 905, and a reference numeral "906a" denotes an important region thereof.

Referring to FIG. 9, it may be seen that the definition of the region 906a including an important pixel resulting from fusing the visible image 902 and the third thermal image 905 is higher than the definition of the region 904a including an important pixel resulting from fusing the visible image 902 and the second thermal image 903.

Figure 10:
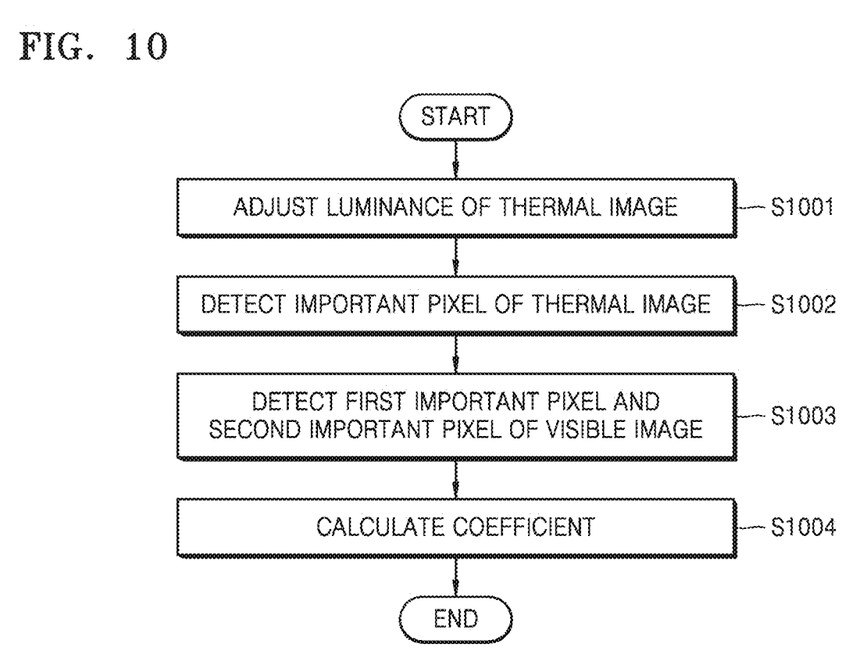
FIG. 10 is a flowchart of an image fusing method, according to an exemplary embodiment.

FIG. 10 is a flowchart of an image fusing method, according to an exemplary embodiment.

Referring to FIG. 10, the image fusing method of the exemplary embodiment is a method for fusing a thermal image of a subject and a visible image of the subject, and includes operation S1002 of detecting an important pixel of the thermal image, operation S1003 of detecting a first important pixel and a second important pixel of the visible image, and operation S1004 of calculating a pixel coefficient.

In operation S1002, the image fusing apparatus may detect an important pixel of the thermal image of which has a luminance value is equal to or greater than a first reference value calculated based on a mean of luminance values of the thermal image. Operation S1002 may correspond to operation S303 of FIG. 3, and a pixel having a value "1" as a variable may be the important pixel of the thermal image. Herein, the first reference value may correspond to a mean of luminance values of the thermal image and may be equal to a sum of the mean and a standard deviation of luminance values of the thermal image. By operation S1002, the important pixel included in the thermal image and having a considerably high luminance is detected.

In operation S1003, the image fusing apparatus may detect a first important pixel of the visible image of which a luminance value is equal to or greater than a second reference value calculated based on a mean of luminance values of the visible image, and a second important pixel of the visible image of which a luminance value is equal to or greater than a third reference value. Operation S1003 may correspond to operation S305 of FIG. 3, the first important pixel may be a pixel having a value of 1 as a first variable, and the second important pixel may be a pixel having a value of 1 as a second variable. Here, the second reference value may be obtained by subtracting a standard deviation from a mean of luminance values of the visible image, and the third reference value may be a threshold luminance value of the visible image. By operation S1003, the first important pixel included in the visible image and having a non-dark luminance is detected, and the second important pixel included in the visible image and having a saturated luminance is detected.

In operation S1004, a pixel coefficient for each pixel of the thermal image for adjustment of a weight of the thermal image for fusing the thermal image and the visible image is set based on the importance of each pixel. Since the operation of adjusting the weight has already been described with reference to FIG. 5, redundant descriptions thereof will be omitted for conciseness.

The image fusing method according to the exemplary embodiment may further include operation S1001 of adjusting luminance values of the thermal image to process the thermal image. Since operation S1001 is the same as operation S301, redundant descriptions thereof will be omitted.

Figure 11:
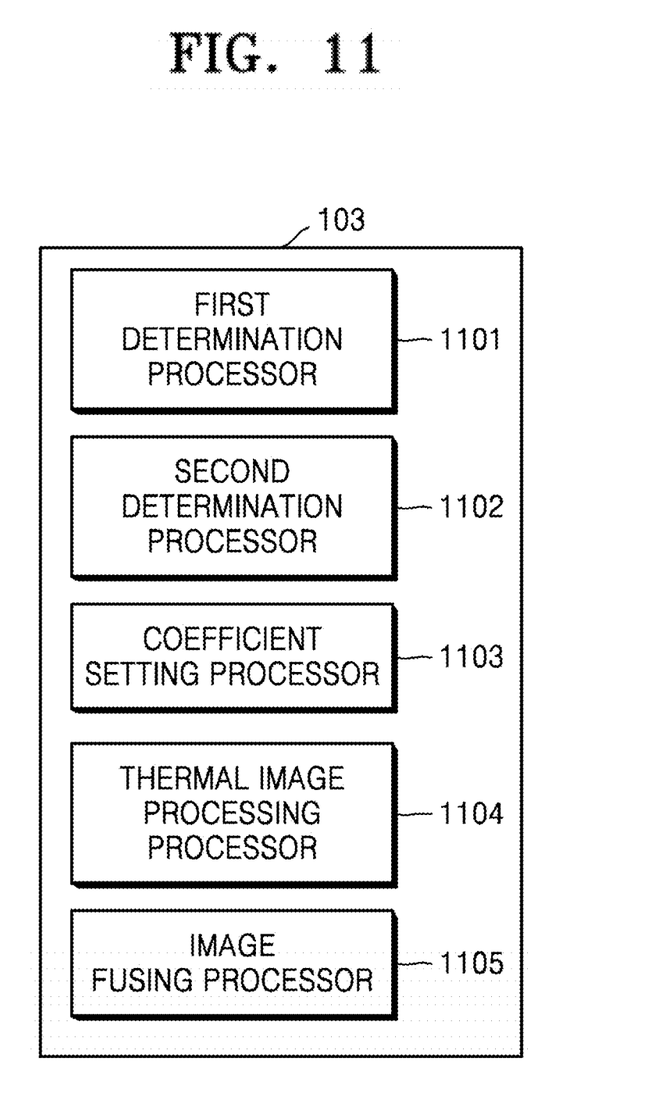
FIG. 11 is a block diagram of an image fusing apparatus, according to an exemplary embodiment.

FIG. 11 is a block diagram of an image fusing apparatus, according to an exemplary embodiment.

Referring to FIG. 11, the image fusing apparatus according to the exemplary embodiment may corresponds to the controller illustrated in FIG. 1, and include a first determination processor 1101, a second determination processor 1102, a coefficient setting processor 1103, a thermal image processor 1104, and an image fusing processor 1105.

The first determination processor 1101 determines a pixel of the thermal image, which has a luminance value equal to or greater than a first reference value calculated based on a mean of luminance values of the thermal image, as an important pixel of the thermal image. Since the operation of the first determination processor 1101 is the same as operation S303, redundant descriptions thereof will be omitted.

The second determination processor 1102 determines a pixel of the visible image of which a luminance value is equal to or greater than a second reference value calculated based on a mean of luminance values of the visible image, as a first important pixel of the visible image, and detects a pixel of the visible image of which has a luminance value is equal to or greater than a third reference value that is preset, as a second important pixel of the visible image. Since the operation of the second determination processor 1102 is the same as operation S305, redundant descriptions thereof will be omitted. The first and second determination processors may be implemented as a single determination processor, according to an exemplary embodiment.

The coefficient setting processor 1103 adjusts a weight of the thermal image used for fusing the thermal image and the visible image, by setting a pixel coefficient for each pixel of the thermal image, based on the importance of each pixel. Since the operation of the coefficient setting processor 1103 is the same as operation S307, redundant descriptions thereof will be omitted.

Since the operation of the thermal image processor 1104 for preprocessing the thermal image is the same as operations S301 and S307, redundant descriptions thereof will be omitted.

The image fusing processor 105 fuses the thermal image and the visible image by a weighted sum of the visible image and the thermal image to which the pixel coefficient is applied. Since the operation of the image fusing processor 1105 is the same as operation S309, redundant descriptions thereof will be omitted.

As described above, according to the above exemplary embodiments, in the image fusing method, the luminance of each pixel of the thermal image is adjusted in consideration of importance of each pixel of the thermal image and importance of each pixel of the visible image in terms of luminance thereof. Then, the visible image and the second thermal image are fused together.

Accordingly, the problems of the image fusing method according to the related art may be addressed. That is, the problem of the definition of an image being reduced in a portion of the relatively bright important region due to a high luminance of the thermal image may be addressed.

Thus, by the image fusing method according to the above exemplary embodiments, the overall definition of an image in the relatively bright important region may be improved. That is, the overall definition of the fused image may be improved by increasing or decreasing the pixel coefficient of the thermal image for the pixel included in the relatively bright important region by determining the pixel coefficient for the pixel of a specific region in consideration of importance of each pixel of the thermal image and importance of each pixel of the visible image.

There may be provided a non-transitory computer readable medium that stores a program performing the operations of the image fusing method described above. The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a compact disc (CD), a digital versatile disk (DVD), a hard disk, a blue-ray disk, a universal serial bus (USB), a memory card, a read-only memory (ROM), or the like.

At least one of the components, elements or units represented by a block as illustrated in FIG. 11 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The inventive concept may be used not only in fusing a thermal image and a visible image but also in fusing other images.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the exemplary embodiments have been described with reference to the drawings, it will be understood by those of ordinary skill in the art that various changes in form and details may be made therein without departing from the spirit and scope of the inventive concept as defined by the following claims.

What is claimed is:

1. An image fusing method for fusing a thermal image and a visible image of a subject, the image fusing method comprising:

detecting an important pixel of the thermal image based on a luminance value of each pixel of the thermal image;

detecting a first important pixel and a second important pixel of the visible image based on a luminance value of each pixel of the visible image;

setting a pixel coefficient for each pixel of the thermal image according to whether each pixel of the thermal image is the important pixel and whether each pixel of the visible image is at least one of the first important pixel and the second important pixel;

generating another thermal image by applying the pixel coefficient to the luminance value of each pixel of the thermal image; and fusing the other thermal image and the visible image to generate a fused image, at an image fusing controller, wherein the detecting the important pixel comprises:

determining the important pixel of the thermal image of which a luminance value is equal to or greater than a first reference value calculated based on a mean of luminance values of the thermal image;

determining the first important pixel of the visible image of which a luminance value is equal to or greater than a second reference value calculated based on a mean of luminance values of the visible image; and determining the second important pixel of the visible image of which a luminance value is equal to or greater than a third reference value calculated based on a mean of luminance values of the visible image.

2. The image fusing method of claim 1, wherein the first reference value is obtained by adding the mean to a standard deviation of the luminance values of the thermal image.

3. The image fusing method of claim 1, wherein the second reference value is obtained by subtracting a standard deviation from the mean of the luminance values of the visible image.

4. The image fusing method of claim 1, wherein the third reference value is preset at an image fusing processor performing the fusing.

5. The image fusing method of claim 1, wherein the setting the pixel coefficient for each pixel of the thermal image comprises setting a pixel coefficient for a pixel of the thermal image to a value "1" if this pixel is determined to be the important pixel of the thermal image, and a corresponding pixel of the visible image is determined to be not the first important pixel of the visible image but the second important pixel of the visible image, as a result of the determining.

6. The image fusing method of claim 1, wherein the setting the pixel coefficient for each pixel of the thermal image comprises setting a pixel coefficient for a pixel of the thermal image to a value selected between "0" and "1" if a corresponding pixel of the visible image is determined to be not the second important pixel of the visible image but the first important pixel of the visible image, as a result of the determining.

7. The image fusing method of claim 6, wherein in the setting the pixel coefficient for each pixel of the thermal image, a pixel coefficient for a pixel of the thermal image set if this pixel is determined to be not the important pixel of the thermal image is smaller than a pixel coefficient for this pixel of the thermal image set if this pixel is determined to be the important pixel of the thermal image and the corresponding pixel of the visible image is determined to be not the second important pixel of the visible image but the first important pixel of the visible image, as a result of the determining.

8. The image fusing method of claim 1, wherein the fusing the other thermal image and the visible image is performed by adding the visible image, to which a weight is applied, and the other thermal image to which the pixel coefficient and another weight are applied.

9. The image fusing method of claim 1, further comprising adjusting a luminance value of each pixel of an original thermal image of the subject to generate the thermal image before the detecting the important pixel of the thermal image,
wherein the adjusting comprises:
increasing a luminance value of a pixel of the original thermal image if the luminance value of this pixel is higher than a mean of luminance values of the visible image; and
decreasing the luminance value of this pixel if the luminance value of this pixel is not higher than the mean of the luminance values of the visible image.

10. An image fusing apparatus for fusing a thermal image and a visible image of a subject, the image fusing apparatus comprising:
a hardware processor configured to implement:
a first determination processor configured to detect an important pixel of the thermal image based on a luminance value of each pixel of the thermal image;
a second determination processor configured to detect a first important pixel and a second important pixel of the visible image based on a luminance value of each pixel of the visible image;
a pixel coefficient setting processor configured to set a pixel coefficient for each pixel of the thermal image according to whether each pixel of the thermal image is the important pixel and whether each pixel of the visible image is at least one of the first important pixel and the second important pixel;
a thermal image processor configured to generate another thermal image by applying the pixel coefficient to the luminance value of each pixel of the thermal image; and
an image fusing processor configured to fuse the other thermal image and the visible image to generate a fused image,
wherein the first determination processor is configured to determine the important pixel of the thermal image of which a luminance value is equal to or greater than a first reference value calculated based on a mean of luminance values of the thermal image, and
wherein the second determination processor is configured to determine the first important pixel of the visible image of which a luminance value is equal to or greater than a second reference value calculated based on a mean of luminance values of the visible image, and determine the second important pixel of the visible.

11. The image fusing apparatus of claim 10, wherein the first reference value is obtained by adding the mean to a standard deviation of the luminance values of the thermal image.

12. The image fusing apparatus of claim 10, wherein the second reference value is obtained by subtracting a standard deviation from the mean of the luminance values of the visible image.

13. The image fusing apparatus of claim 10, wherein the third reference value is preset at the image fusing processor.

14. The image fusing apparatus of claim 10, wherein the pixel coefficient setting processor sets a pixel coefficient for a pixel of the thermal image to a value "1" if this pixel is determined to be the important pixel of the thermal image, and a corresponding pixel of the visible image is determined to be not the first important pixel of the visible image but the second important pixel of the visible image, as a result of the determining by the first and second determination processors.

15. The image fusing apparatus of claim 10, wherein the pixel coefficient setting processor sets a pixel coefficient for a pixel of the thermal image to a value selected between "0" and "1" if a corresponding pixel of the visible image is determined to be not the second important pixel of the visible image but the first important pixel of the visible image, as a result of the determining by the first and second determination processors.

16. The image fusing apparatus of claim 15, wherein the pixel coefficient setting processor sets the pixel coefficient for each pixel of the thermal image such that a pixel coefficient for a pixel of the thermal image set if this pixel is determined to be not the important pixel of the thermal image is smaller than a pixel coefficient for this pixel of the thermal image set if this pixel is determined to be the important pixel of the thermal image and the corresponding pixel of the visible image is determined to be not the second important pixel of the visible image but the first important pixel of the visible image, as a result of the determining by the first and second determination processors.

17. The image fusing apparatus of claim 10, wherein the image fusing processor is configured to fuse the other thermal image and the visible image by adding the visible image, to which a weight is applied, and the other thermal image to which the pixel coefficient and another weight are applied.

18. The image fusing apparatus of claim 10, wherein the thermal image processor is further configured to adjust a luminance value of each pixel of an original thermal image of the subject to generate the thermal image before the determination processor detects the important pixel of the thermal image, and wherein the thermal image processor adjusts the luminance value of each pixel of the original thermal image such that a luminance value of a pixel of the original thermal image is increased if the luminance value of this pixel is higher than a mean of luminance values of the visible image, and the luminance value of this pixel is decreased if the luminance value of this pixel is not higher than the mean of the luminance values of the visible image.

* * * * *